United States Patent [19]

Asada et al.

[11] Patent Number: 5,680,612

[45] Date of Patent: Oct. 21, 1997

[54] DOCUMENT RETRIEVAL APPARATUS RETRIEVING DOCUMENT DATA USING CALCULATED RECORD IDENTIFIER

[75] Inventors: Kazushige Asada, Kamifukuoka; Hideaki Nakayama; Toshio Itoh, both of Tokyo; Kensaku Yamamoto, Tokorozawa; Hiroshi Takegawa, Yokohama; Katsumi Kanasaki; Atsushi Iizawa, both of Tokyo; Kazutaka Furuse, Kawasaki; Susumu Kanemune, Yono, all of Japan

[73] Assignee: Ricoh Company, Ltd., Japan

[21] Appl. No.: 393,917

[22] Filed: Feb. 24, 1995

[30] Foreign Application Priority Data

Mar. 2, 1994 [JP] Japan ................... 6-032441

[51] Int. Cl.⁶ .................................... G06F 17/30
[52] U.S. Cl. ............... 395/613; 395/603; 395/606; 395/612; 395/616; 382/317; 434/178
[58] Field of Search ................... 395/606, 600, 395/145, 603, 612, 613, 616; 382/317; 434/178

[56] References Cited

U.S. PATENT DOCUMENTS

| 5,444,840 | 8/1995 | Froessi ................... 395/145 |
| 5,452,379 | 9/1995 | Poor ..................... 382/317 |
| 5,521,991 | 5/1996 | Billings ................. 382/317 |
| 5,542,086 | 7/1996 | Andrew et al. ........... 395/600 |
| 5,556,282 | 9/1996 | Middlebrook ............. 434/178 |

OTHER PUBLICATIONS

"Access Method of Text" by Christos Faloutsos (Computing Surveys, vol.17, No.1, Mar. 1985, pp. 49–74).
"Partial–Match Retrieval via the Method of Superimposed Codes" by Charles S. Roberts (Proceedings of the IEEE., vol.67, No.12, Dec. 1979, pp. 1624–1642).
"Description and Performance Analysis of Signature File Methods for Office Filing" by Christos Faloutsos (ACM Transaction Office Information Systems, vol.5, No.3, Jul. 1987, pp. 237–257).

Primary Examiner—Thomas G. Black
Assistant Examiner—C. Lewis
Attorney, Agent, or Firm—Dickstein Shapiro Morin & Oshinsky LLP

[57] ABSTRACT

There is provided a document retrieval apparatus in which signatures can be easily extracted from document data, and false drop probability is reduced even for a long document so as to reduce a burden of eliminating the false drop. A processing unit converts the document data and the character string into character codes, respectively. The processing unit extracts signatures from each of the character codes, and calculates a record identifier of the document data to be stored based on a storing position of the document data in a record file. A data storing unit stores the document data to be registered in the record file, and stores the signature corresponding to the document data to be registered in a signature file. The signature is stored in a storing position in the signature file, the storing position being designated by the record identifier of corresponding document data stored in the record file. The processing unit retrieves the document data containing a character string identical to the character string to be searched for by referring to a record identifier calculated based on a storing position of the signature in a signature file.

9 Claims, 10 Drawing Sheets

BIT MAP THAT IS NOT COMPRESSED

BIT MAP THAT IS COMPRESSED

DOCUMENT RETRIEVAL APPARATUS RETRIEVING DOCUMENT DATA USING CALCULATED RECORD IDENTIFIER

BACKGROUND OF THE INVENTION

The present invention generally relates to document retrieval apparatuses, and more particularly to a document retrieval apparatus in which a designated character string, including English characters and Japanese characters, is searched for from registered documents by utilizing a signature file.

A signature is a binary bit pattern extracted from a character string according to a given method. Characters and words comprising a character string can be numerically expressed by a bit pattern in which "1"s are set in the bit positions thereof. The signature is obtained by hashing the numerical expression from 0 to the maximum number of the bit positions. Supposing that there is a Japanese character string, for example, "コヒ–", of which "コ" can be numerically expressed by "5", "ヒ" by "7", and "-" by "12", these numbers represent the bit positions in which "1" is set. In this case, since "1" is set in the fifth, seventh and twelfth bit positions, the bitmap (bit pattern) of "000010100001" is obtained. The signature comprises the bitmap.

A signature extracting method is described in "Access Method of Text" by Christos Faloutsos (Computing Surveys, vol.17, No. 1, March 1985, pp 49–74). In this literature, a method is described in which a signature of document data is obtained by superimposing signatures, each of which is referred to as a word signature, extracted from each of words contained in the document data. The term "superimpose" means an operation of extracting a new signature by performing an OR operation on bit values in the corresponding bit positions of a plurality of signatures.

There is another method in which the document data is divided into a plurality of character strings, each character string having a predetermined uniform number of characters therein and having portions overlapping preceding and following character strings, the character strings being superimposed as is in the above-mentioned method using the word signature. Additionally, there is a method in which a long document data is divided into a plurality of logical blocks, each block being composed of a single sentence or a single paragraph. In this method, a set of signatures extracted from the blocks corresponds to the document data. The signature extracted from each of the blocks is referred to as a block signature.

When the signature is used for retrieving a document containing a particular character string to be searched for, there is a probability that a document which does not contain the particular character string will be retrieved because identical signatures may be extracted from different character strings. The document which does not contain the particular character string, which document it is not desirable to retrieve, is referred to as a false drop, and the document containing the particular character string, which document it is desirable to retrieve, is referred to as an actual drop.

In a document retrieval apparatus, the signature is extracted from each document, and then the signatures are collectively stored in a file referred to as a signature file. The signature files are generally classified into two kinds according to its method for storing the signature. One kind corresponds to a method in which signatures are sequentially stored in the signature file. A file structure associated with this method is referred to as a sequential structure file. The other kind corresponds to a method in which each bit value of the signatures is stored in the signature file, as a bitmap comprising bit values corresponding to the same bit position in each of the signatures. A file structure associated with this method is referred to as a bit sliced signature file. The signature file according to the bit sliced signature file is described in "Partial-Match Retrieval via the Method of Superimposed Codes" by Charles S. Roberts (Proceedings of the IEEE., Vol. 67, No. 12, December 1979, pp 1624–1642).

As a method for compressing a bitmap of a signature having a sequential structure, Run Length Encoding is well known. This method is described in "Description and Performance Analysis of Signature File Methods for Office Filing" by Christos Faloutsos (ACM Transaction Office Information Systems, Vol. 5, No. 3, July 1987, pp 237–257.). However, a method for compressing a bitmap associated with the bit sliced signature file has not been suggested in the prior art.

In the above-mentioned prior art, there are problems as mentioned below.

1) In the conventional method in which a single document is represented by a plurality of block signatures, a single sentence or a single paragraph is regarded as a single block to extract the block signature so that a character string, which is to be searched for, corresponding to a single word is not split into two blocks. In this method, when a signature is extracted from document data, punctuation in the document must be detected. Particularly for a document written in Japanese, it is difficult to detect punctuation, and thus there is a problem that signature extracting process is not efficiently performed.

2) In the conventional method in which word signatures are superimposed to obtain a document signature, there is a probability that "1" will be frequently set in a limited particular bit position due to a large number of the same words or phrases being present in the document. In such a case, when a sliced signature file is used, a number of bit positions in which "1" is set varies for each bit sliced bitmap. When a document retrieving operation is performed, a signature of a character string to be searched for is compared with a document signature in the signature file. In this comparison process, if a bit position in which "1" is frequently set is processed first, a processing speed for an entire comparison process becomes slow.

3) In the conventional method in which the bit sliced signature file is used for a signature file, when a document signature in the signature file is changed to another document signature, each of the bit positions in the bitmap have to be changed. Accordingly, if a number of bits in the bitmap is increased, a longer time is needed for changing each bit in the bitmap.

4) When a large volume of documents is stored or when a number of bits in the bitmap has to be increased, a large memory area is occupied by the signature file. In order to reduce the memory area occupied by the signature file, a compression method is used for the signature file. However, an existing compression method in the prior art is not applicable to the signature file having the bit slice structure.

5) In the conventional method in which a bit slice structure is used for a signature file, actual document data picked up by searching has to be retrieved for output and for comparing it with the actual character string to be searched for so as to eliminate a false drop. In order to retrieve the actual document data, a record identifier has to be obtained according to a position in which the document signature which has been picked up is stored in the signature file. Accordingly, a mapping table needs to be referred to when retrieving an actual document data output.

SUMMARY OF THE INVENTION

It is a general object of the present invention to provide an improved and useful document retrieval apparatus in which the above-mentioned problems are eliminated.

A more specific object of the present invention is to provide a document retrieval apparatus in which a block signature can be easily extracted from a document of which punctuation are difficult to detect, and false drop probability is reduced even for a long document so as to reduce a burden of eliminating the false drop.

Another object of the present invention is to provide a document retrieval apparatus in which a signature corresponding to a bitmap having a smaller number of "1"s is extracted from a character string to be searched for, and a bit position is referred to in an order in which a bit position having a smaller number of "1"s is set first.

Another object of the present invention is to provide a document retrieval apparatus in which a registration of document data is simplified by setting "1" in bit positions of the bitmap of the signature file, which bit positions correspond to only bit positions of a block signature in which "1" is set.

Another object of the present invention is to provide a document retrieval apparatus in which a memory area for the signature file is reduced by selectively compressing the signature by dividing the bitmap of the signature into a plurality of pages, and a burden of registering document data is reduced by eliminating an expanding operation necessary for storing the block signature.

Another object of the present invention is to provide a document retrieval apparatus in which a memory area occupied by a map table is eliminated, and a burden of referring to the map table is thus eliminated by obtaining a record identifier by a calculation based on a stored position of a block signature.

In order to achieve the above-mentioned objects, there is provided according to the present invention, a document retrieval apparatus which retrieves document data registered therein, the document data containing a character string identical to a search character string which is to be searched for, the document retrieval apparatus comprising:

an input unit through which the document data to be registered and the search character string to be searched for are input;

a processing unit, connected to the input unit, converting the document data and the character string into character codes, respectively, by using a predetermined character code conversion method, the processing unit extracting signatures from each of the character codes, and calculating a first record identifier of the document data to be stored, according to which first record identifier the signature corresponding to the document data to be registered is stored, the processing unit retrieving the document data containing a character string identical to the character string to be searched for by referring to a second record identifier calculated based on a storing position of the signature;

a data storing unit comprising a record file and a signature file, the record file storing the document data to be registered, the signature file storing the signature corresponding to the document data to be registered, the signature being stored in a storing position in the signature file, the storing position being designated by the first record identifier of corresponding document data stored in the record file; and an output unit, connected to the processing unit, outputting the document data retrieved by the processing unit, which document data contains the character string identical to the search character string to be searched for.

Other objects, features and advantages of the present invention will become more apparent from the following description when read in conjunction with the accompanying drawings.

DETAILED DESCRIPTION OF THE PREFERRED EMBODIMENT

Figure 1:
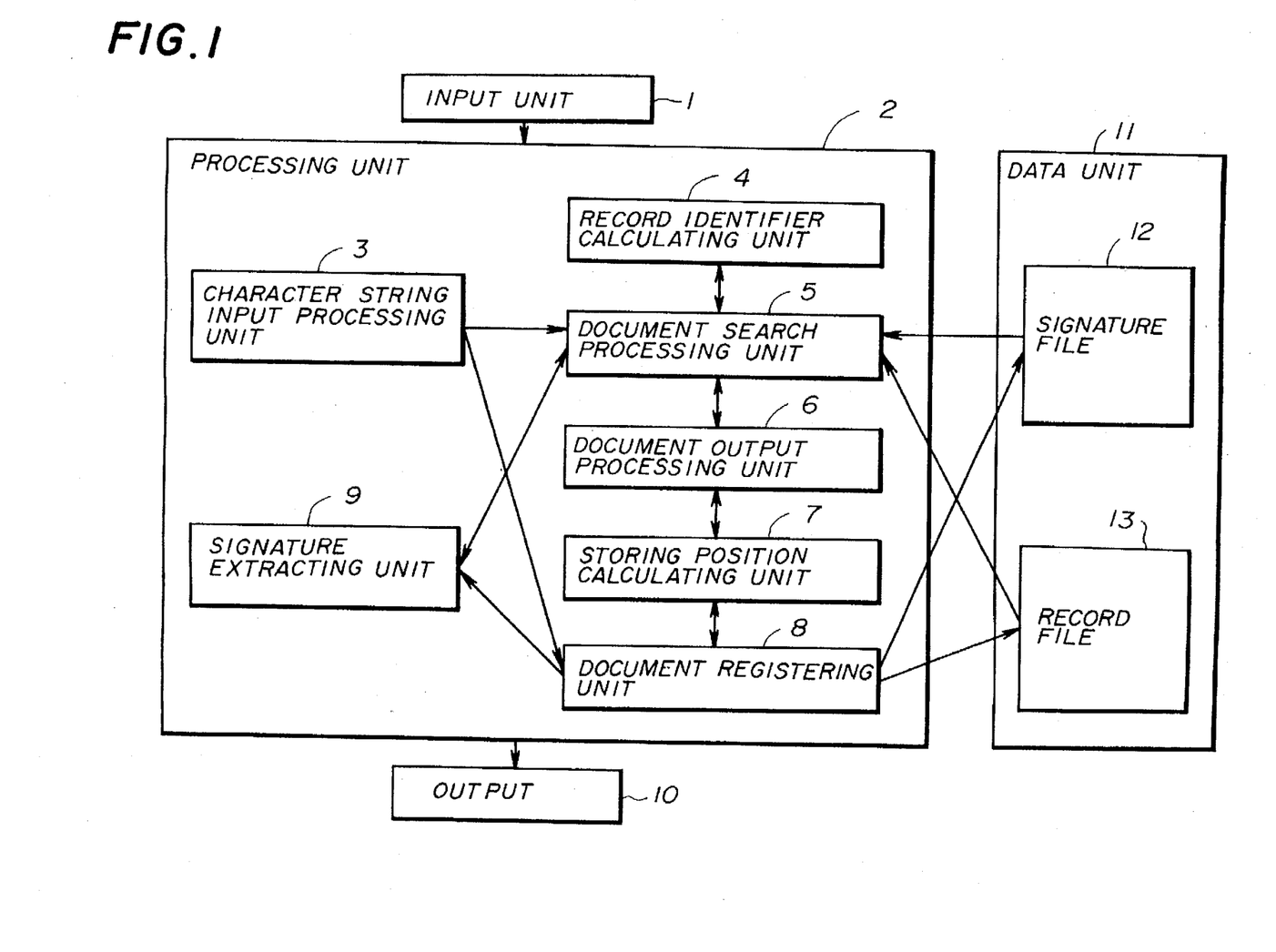
FIG. 1 is a block diagram of an embodiment of a document retrieval apparatus according to the present invention.

A description will now be given, with reference to the figures, of an embodiment according to the present invention. FIG. 1 is a block diagram of an embodiment of a document retrieval apparatus according to the present invention.

In this embodiment, Extended Unix Code (EUC), in which one-byte, two-bytes and three-bytes are used for representing a character, is used as a character code for a character string (hereinafter referred to as a search character string) used for searching and a document (hereinafter referred to as a registration document) to be registered for being searched. However, a character code using only one-byte for a character, such as American Standard Code for Information Interchange (ASCII), or a multi-byte code other than EUC may instead be used.

As shown in FIG. 1, the document retrieval apparatus according to the present invention comprises an input unit 1, a processing unit 2, a data unit 11 and an output unit 10. The processing unit 2 comprises a character string input processing unit 3, a record identifier calculating unit 4, a document search processing unit 5, a document output processing unit 6, a storing position calculating unit 7 and a document registering unit 8. The data unit 11 comprises a signature file 12 and a record file 13.

Character string data of the search character string and the registration document which is input through the input unit 1 is converted into EUC by the character string input processing unit 3. Document data which corresponds to an actual drop is converted from EUC into a character code for output by the document output processing unit 6, and then is output from the output unit 10. Accordingly, the character data of the search character string and the registration document is always in a form of an EUC character string in the processing unit 2. Additionally, document data, which is the character string data of the registration document, is stored in the record file 13 always in a form of an EUC character string.

The document retrieval apparatus shown in

FIG. 1 has functions for registering the document data, for searching a character string in the document data and for retrieving the document data containing a character string identical to the character string to be searched for.

Figure 6:
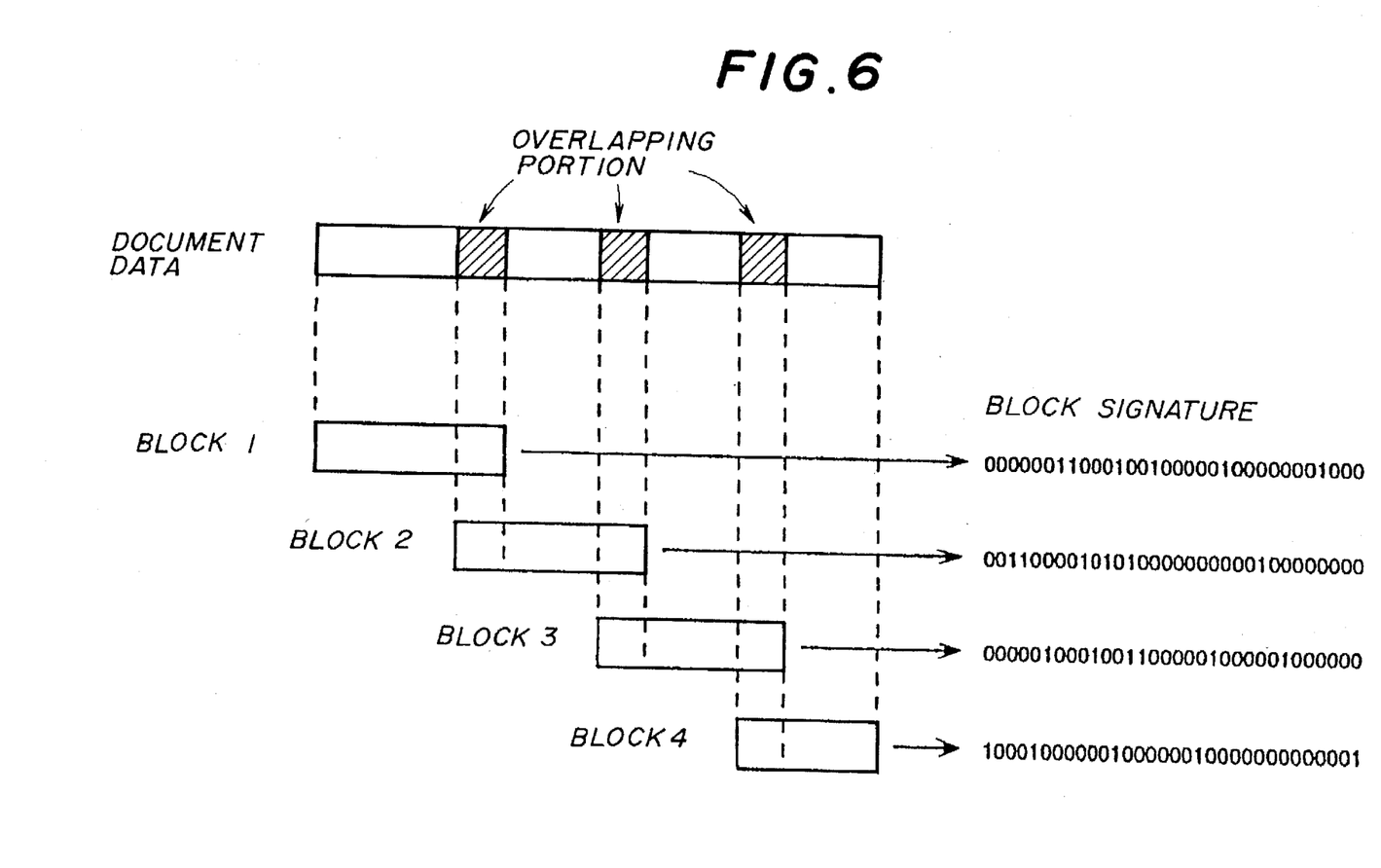
FIG. 6 is an illustration for explaining an operation for extracting block signatures from document data.

When a registering operation of the document data is performed, the document registering unit 8 of the processing unit 2 stores the document data, supplied by the character string input processing unit 3, in the record file 13 of the data unit 11. The document data is also supplied to the storing position calculating unit 7 from the document registering unit 8 so as to calculate a storing position of a signature of the document data being registered in the signature file 12. The calculation is performed based on a record identifier corresponding to the storing position of the document data in the record file. The document registering unit 8 also divides the document data into blocks, each block having a predetermined uniform number of characters and having portions overlapping adjacent blocks as shown in FIG. 6. The signature extracting unit 9 extracts a block signature from each block, and supplies the extracted block signatures to the document registering unit 8. The document registering unit 8 stores the block signatures in the storing position in the signature file 12 of the data unit 11, which storing position has been calculated by the storing position calculating unit 7.

When a document retrieving operation is performed, the document search processing unit 5 extracts a partial character string having a predetermined number of characters, which predetermined number does not exceed a number of characters in the above-mentioned overlapping portion of the block, from the search character string supplied by the character string input processing unit 3. The signature extracting unit 9 extracts a signature from the partial character string extracted by the document search processing unit 5, the signature being used for searching and referred to as a search signature. The document search processing unit 5 obtains a storing position of the block signature in the signature file 12 of the data unit 11, which block signature is determined to contain a character string identical to the search character string by comparing a bitmap of the search signature with a bitmap of the block signature.

The record identifier calculating unit 4 calculates a value of the record identifier of document data in the record file 13, which document data corresponds to the block signature determined to contain the character string identical to the search character string, based on the storing position of the block signature in the signature file. The document search processing unit 5 retrieves document data from the record file 13 by referring to the record identifier calculated by the record identifier calculating unit 4, and supplies the document data to the document output processing unit 6. The document output processing unit 6 selects the document data (actual drop) which actually contains a character string identical to the search character string by eliminating a false drop, and converts the actual drop into a predetermined character code for output. The output unit 10 outputs the predetermined character code supplied by the document output processing unit 6.

Figure 2:
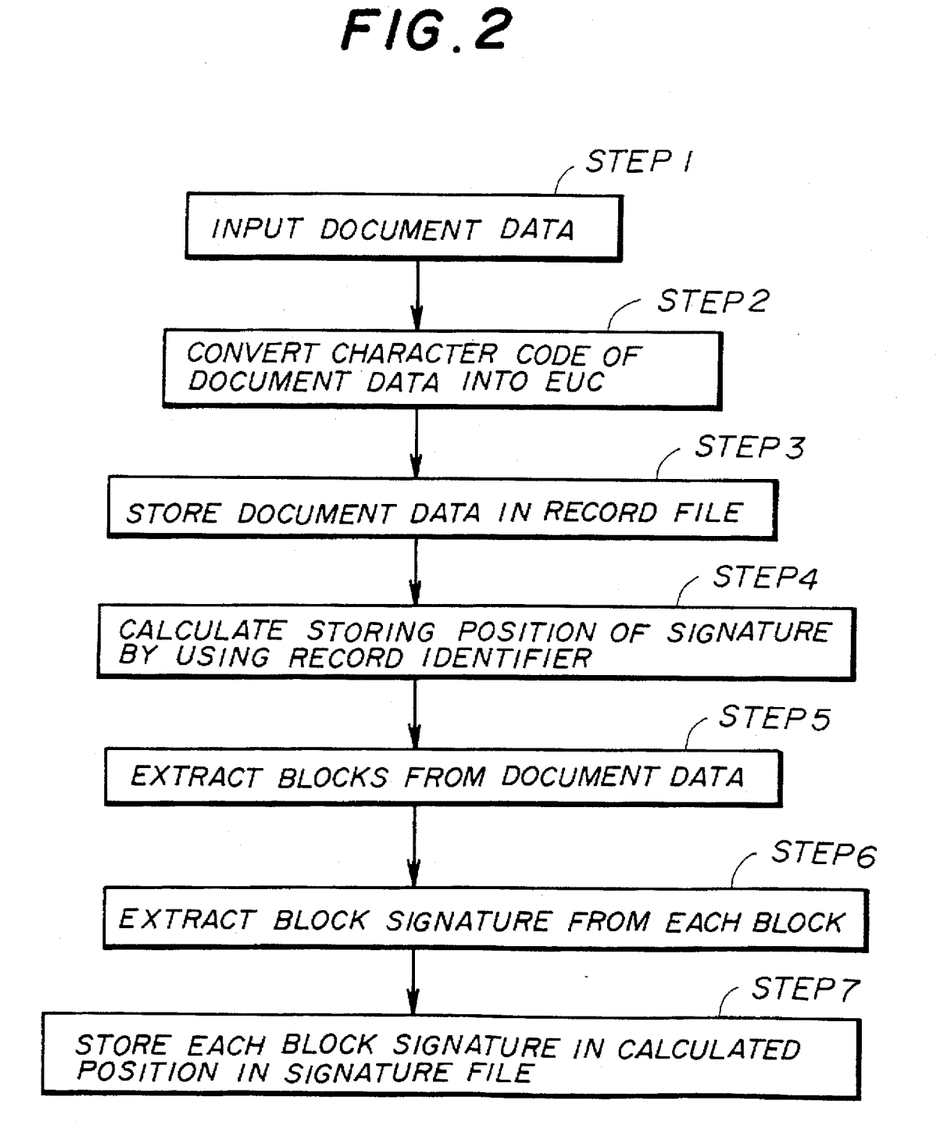
FIG. 2 is a flow chart of a registering operation of document data performed in the document retrieval apparatus shown in FIG. 1.

FIG. 2 is a flow chart of the registering operation of the document data.

The document data is input, in step 1, to the character string input processing unit 3 from the input unit 1. The document data is converted, in step 2, into EUC from the character code of an input, and is transferred to the document registering unit 8. The document registering unit 8 stores, in step 3, the converted document data in the record file 13 of the data unit 11. The storing position calculating unit 7 calculates, in step 4, the storing position in which the signature corresponding to the document data is to be stored in the signature file 12. The document data is divided, in step 5, into a plurality of blocks by the document registering unit 8. The signature extracting unit 9 extracts, in step 6, a block signature from each block supplied by the document registering unit 8, and each of the block signatures is stored, in step 7, in the storing position in the signature file 12.

Figure 3:
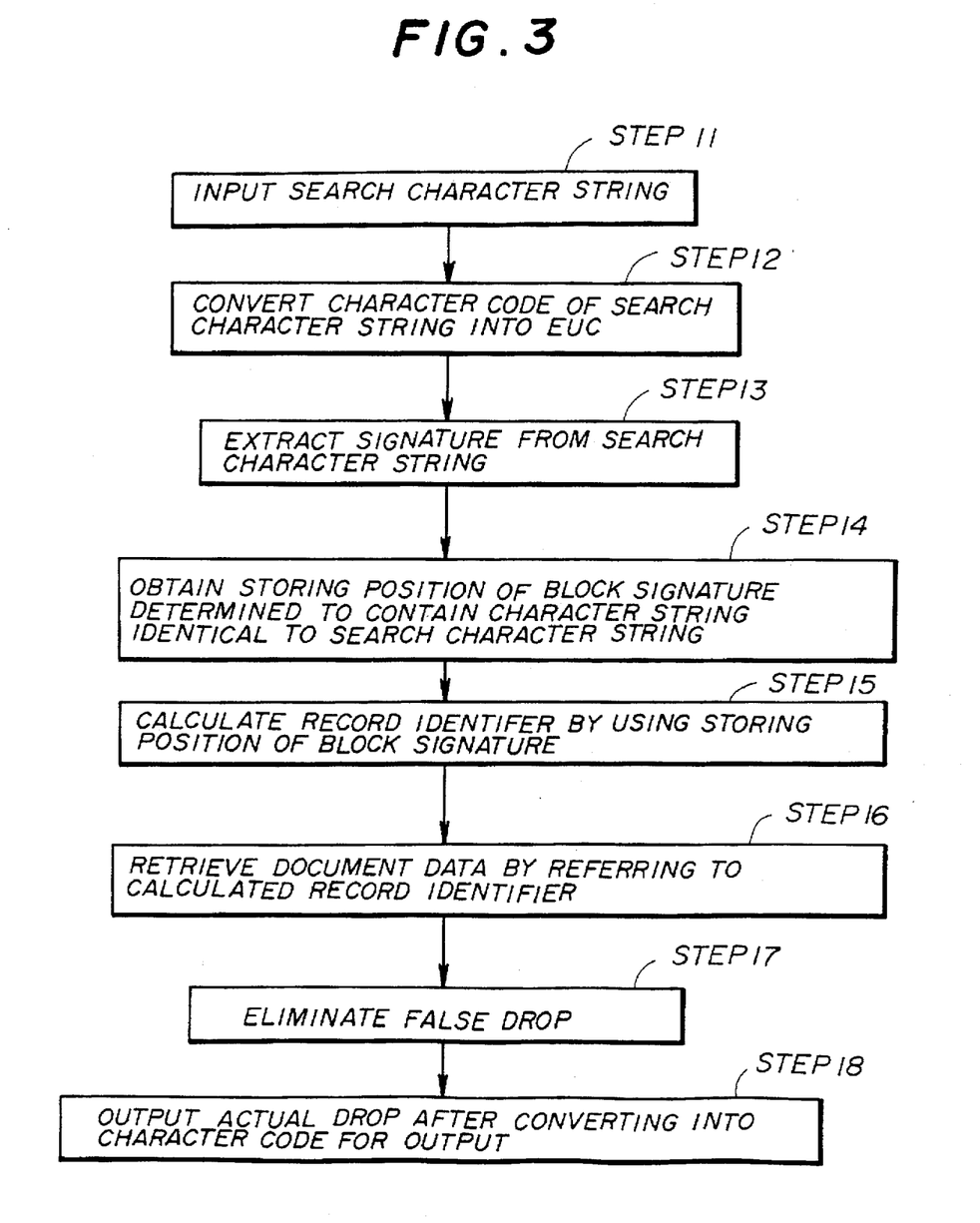
FIG. 3 is a flow chart of a document retrieving operation performed in the document retrieval apparatus shown in FIG. 1.

FIG. 3 is a flow chart of the document retrieving operation performed in the above-mentioned document retrieval apparatus.

The search character string is input, in step 11, to the character string input processing unit 3 from the input unit 1. The search character string is converted, in step 12, into EUC from the character code of an input, and is transferred to the document search processing unit 5. The document search processing unit 5 extracts the partial character string from the search character string, and then the signature extracting unit 9 extracts, in step 13, the search signature from the partial character string. The document search processing unit 5 obtains, in step 14, a storing position of the block signature in the signature file 12, which block signature is determined to contain a character string identical to the search character string by using the search signature and referring to the signature file 12. The record identifier calculating unit 4 calculates, in step 15, a value of the record identifier of the document data in the record file, which document data corresponds to the block signature containing a character string identical to the search character string. The document search processing unit 5 then retrieves, in step 16, document data from the record file 13 by referring to the record identifier calculated by the record identifier calculating unit 4, and supplies the document data to the document output processing unit 6. The document output processing unit 6 selects, in step 17, the actual drop by eliminating a false drop. The actual drop is output, in step 18, after it is converted into a predetermined character code.

Figure 4:
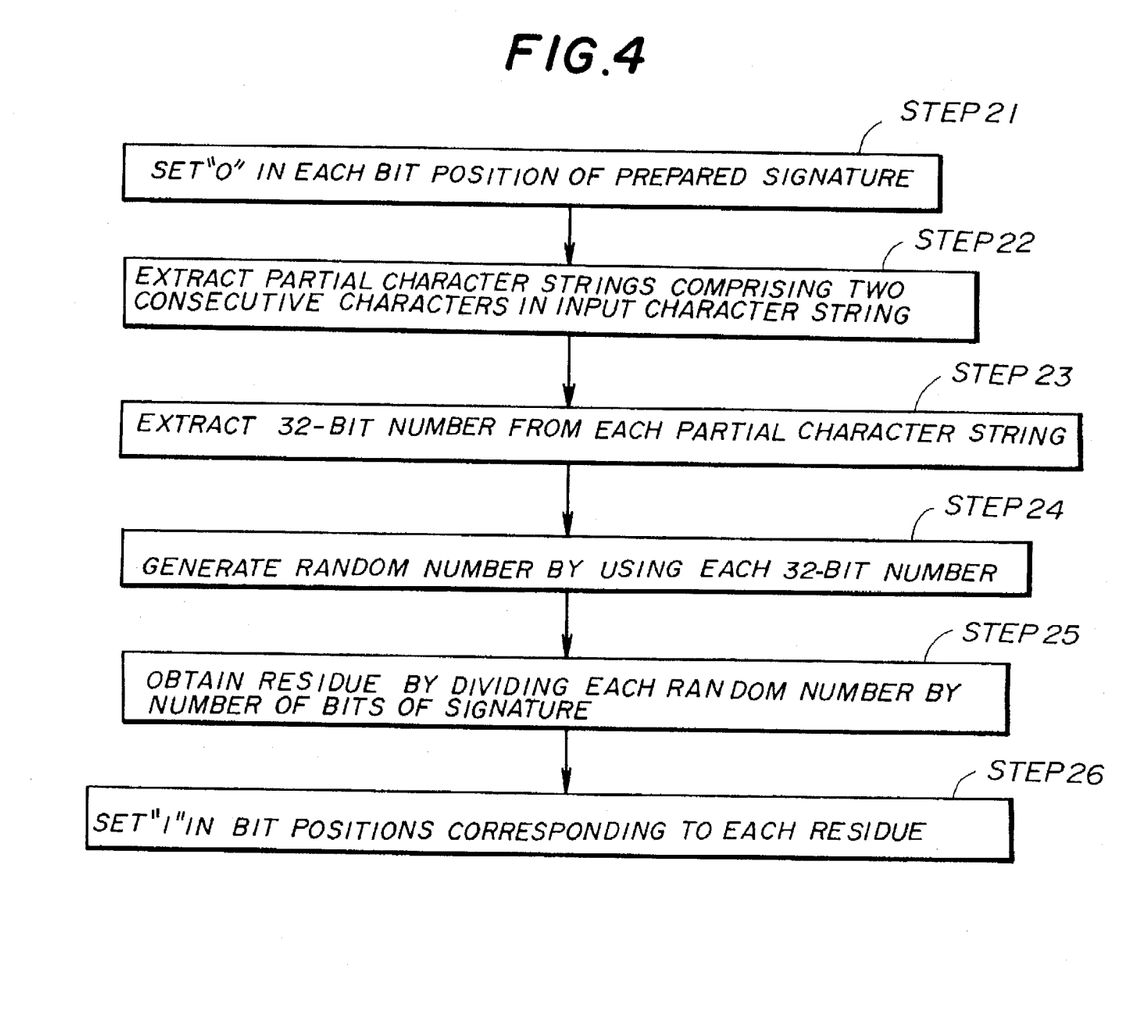
FIG. 4 is a flow chart of a signature extracting operation performed in a signature extracting unit shown in FIG. 1.
Figure 5:
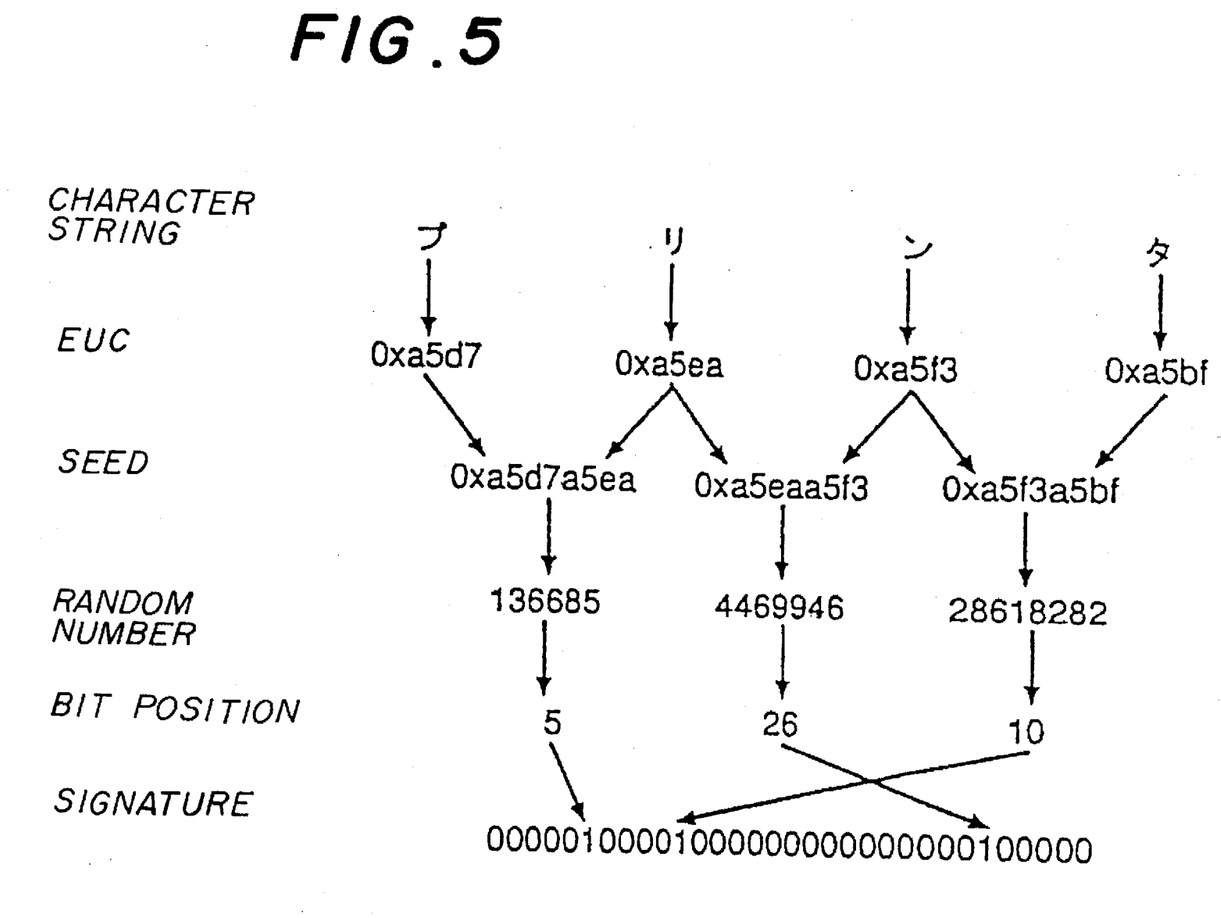
FIG. 5 is an illustration showing a process of extracting a signature from a character string "アリンダ"

FIG. 4 is a flow chart of a signature extracting operation performed in the signature extracting unit 9. The signature extracting unit 9 receives, as an input, a character string formed in a character code of EUC, and outputs a signature extracted from the character string. FIG. 5 is an illustration showing a process of extracting the signature from the character string which is, for example, "ターミナ", as an input.

In the operation shown in FIG. 4, a signature having a predetermined number of bits is prepared, and "0" is set, in step 21, in each bit position of the signature. A partial character string is then extracted, in step 22, from the character string input to the signature extracting unit 9, the partial character string comprising two consecutive characters. A number represented by 32 bits is generated, in step 23, from two characters contained in each partial character string. A random number is generated, in step 24, by using the number represented by 32 bits as a seed. Each random number is divided by the number of bits of the prepared signature, and the residue is obtained in step 25. "1" is set, in step 26, in bit positions corresponding to a value of each residue in the signature. FIG. 5 is an illustration showing a process of extracting a signature from a character string "プリンタ".

In the document registering unit 8, a block signature is extracted from the document data to be registered by the following procedure. FIG. 6 is an illustration for explaining an operation for extracting block signatures from the document data.

First, partial character strings are extracted from the document data, each of the partial character strings having a portion overlapping an adjacent block. Each of the extracted partial character strings comprises a block. In FIG. 6, four blocks are extracted from the document data. Each block comprises a predetermined uniform number of characters except for the last block which comprises a smaller number of characters. Then a block signature is extracted from each block by the signature extracting unit 9.

Figure 7:
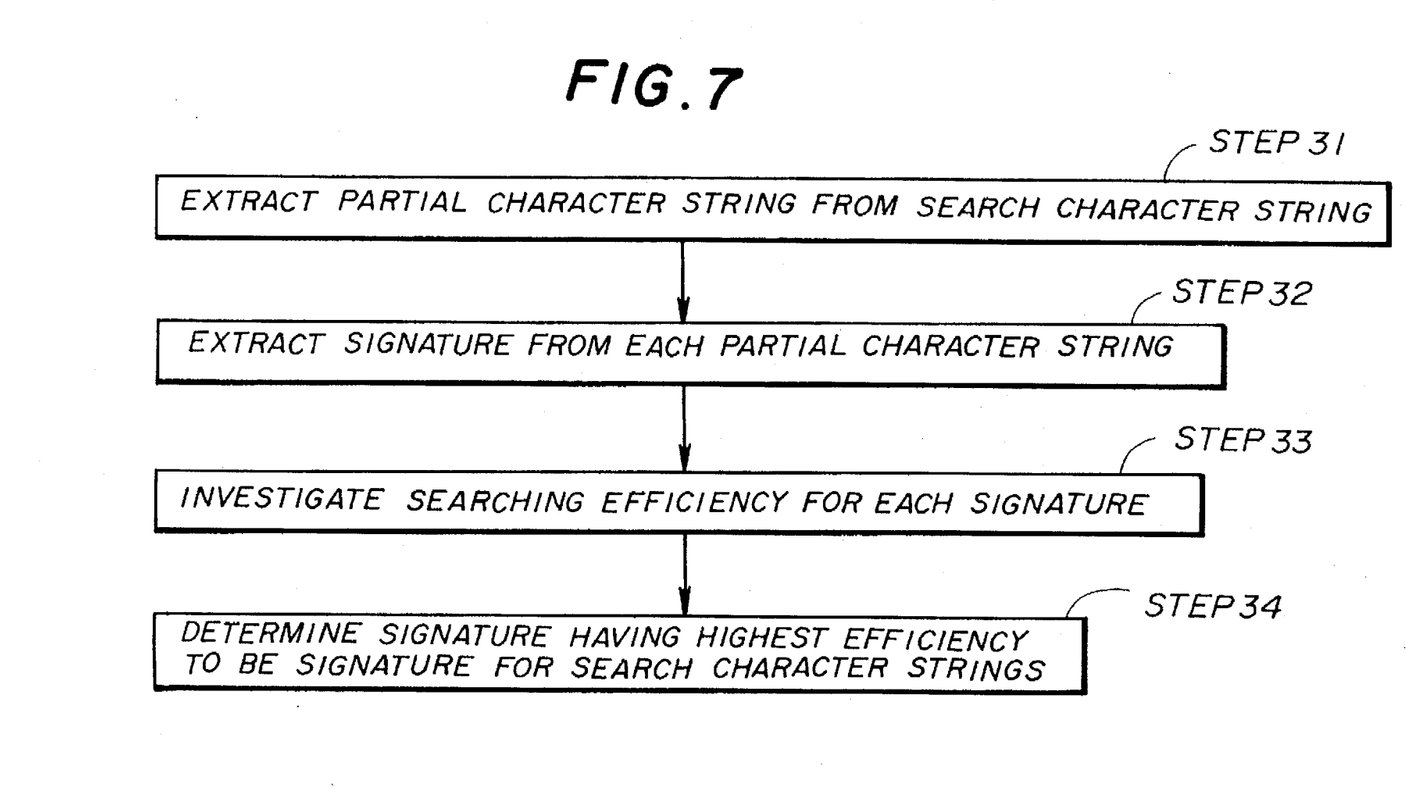
FIG. 7 is a flow chart of an operation for a extracting a signature from a search character string performed by a document search processing unit shown in FIG. 1.

FIG. 7 is a flow chart of an operation for extracting a signature from the search character string performed by the document search processing unit 5.

Partial character strings having a predetermined number of characters are extracted, in step 31, from the search character string. A signature of each of the extracted partial character strings is extracted, in step 32, by the signature extracting unit 9. Then a searching efficiency is investigated, in step 33, for each of the extracted signatures. Thereafter, the signature having the highest efficiency in searching speed is determined, in step 34, to be the search signature of the search character string.

In the signature extracting operation shown in FIG. 7, the signature having the highest efficiency is determined according to the following four conditions.

1) In the bit sliced bitmap corresponding to the bit position of one signature, in which bit position "1" is set, a total number of bits which are set to "1" is defined as Di, where i is an integer from 1 to m, and m is a number of bits set to "1" in the one signature.

2) For one signature, if i<j, then Di<Dj.

3) At an arbitrary i, if one signature has Di smaller than Di of another signature, the one signature is determined to have a searching efficiency higher than the other signature.

4) If i<j, then a signature having smaller Di is determined to have a searching efficiency higher than a signature having smaller Dj.

Figure 8:
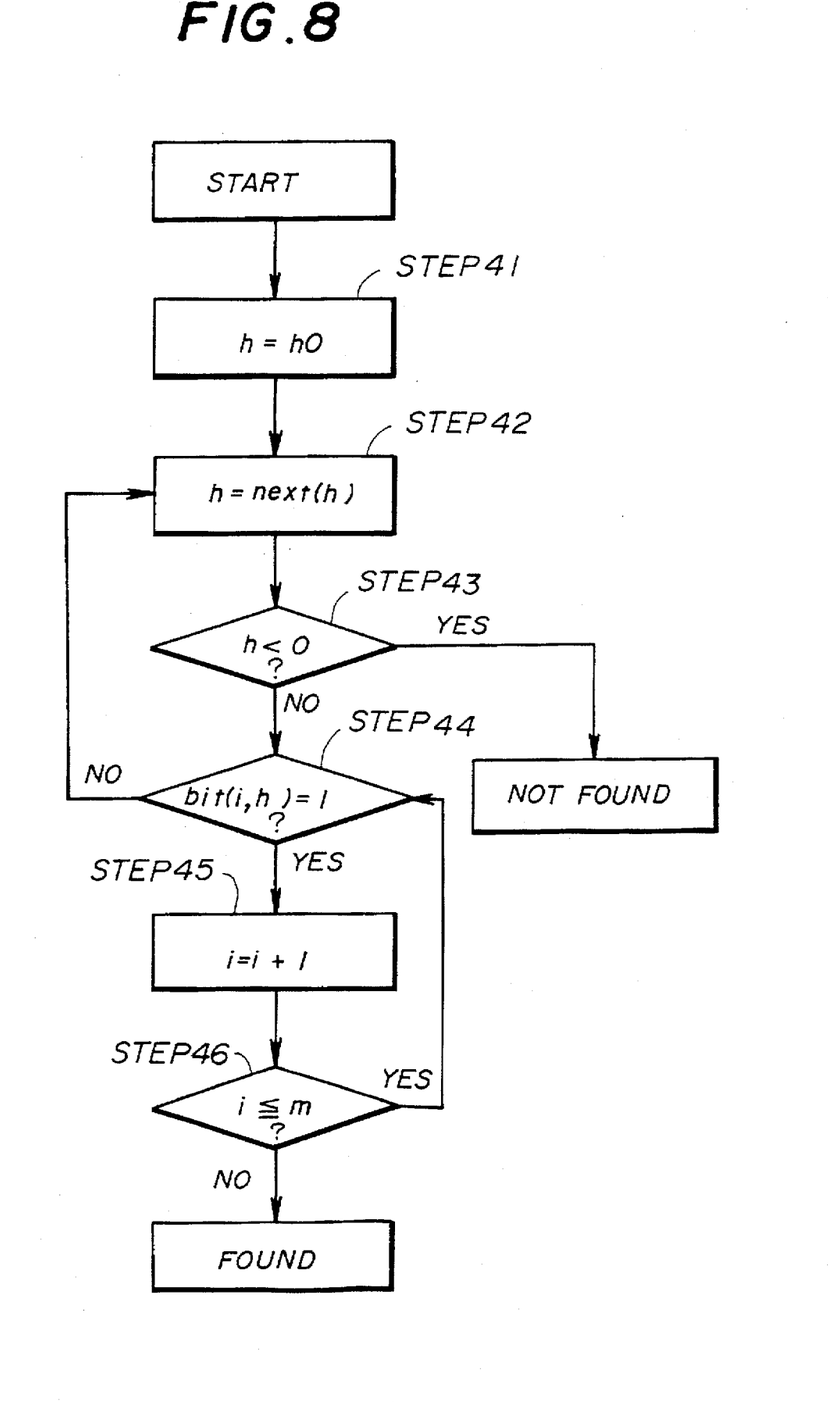
FIG. 8 is a flow chart of an operation for obtaining a storing position of a block signature which is determined to contain a character string identical to a search character string.

FIG. 8 is a flow chart of an operation for obtaining a storing position of the block signature which is determined to contain a character string identical to the search character string.

In the document search processing unit 5, a storing position of the block extracted from document data, which block is determined to contain a character string identical to the search character string, is obtained by comparing the extracted signature of the search character string with the block signature of the document data, which block signature is stored in the signature file 12.

In the operation shown in FIG. 8, the routine starts from START and returns to either FOUND or NOT FOUND. In the following description, h represents a storing position of a block signature in the signature file 12; h0 represents an initial value of h; i represents a number given to a bit sliced bitmap corresponding to a bit position of a signature of the search character string, in which bit position "1" is set, a value of i being from 1 to m; m represents a total number of bits in the signature of the search character string, which bits are set to "1". In the bit sliced bitmap corresponding to a bit position of a signature of the search character string, in which bit position "1" is set, when a total number of bits which are set to "1" is designated to be Di, if i<j, then Di<Dj. "bit(i, h)" represents a function by which a value of a bit position determined by i and h is obtained. "next(h)" is a function by which a bit position of the bit sliced bitmap corresponding to i=1 is obtained, the bit position corresponding to the first bit position in which "1" is set after a position h. The function "next" produces a negative value when "1" is not set in positions after a position h.

In the operation shown in FIG. 8, first, h is set to h0 in step 41. next(h) is then substituted for h in step 42. It is then determined, in step 43, whether or not h is smaller than 0. If h is smaller than 0, the routine ends after proceeding to NOT FOUND. If h is not smaller than 0, the routine proceeds to step 44 where it is determined whether or not bit(i, h) is equal to 1. If bit(i, h) is equal to 1 the routine proceeds to step 44 where i is incremented by 1. It is then determined, in step 46, whether or not i is equal to or smaller than m. If i is equal to or smaller than m, the routine returns to step 44. If i is greater than m, the routine ends after proceeding to FOUND. On the other hand if bit(i, h) is not equal to 1, the routine returns to step 42.

In the operation shown in FIG. 8, when the routine proceeds to FOUND, the value of h represents a storing position of the block signature which is determined to contain a character string identical to the search character string. On the other hand, when the routine proceeds to NOT FOUND, it is determined that no document data present contains a character string identical to the search character string. Additionally, when storing positions of all of the block signatures of the document data, each of which block signatures is determined to contain a character string identical to the search character string, are obtained, the operation is started by setting h0 to 1. Then, if the routine of the operation proceeds to FOUND, h is incremented by 1, and the operation is repeated until the routine proceeds to NOT FOUND.

Figure 9:
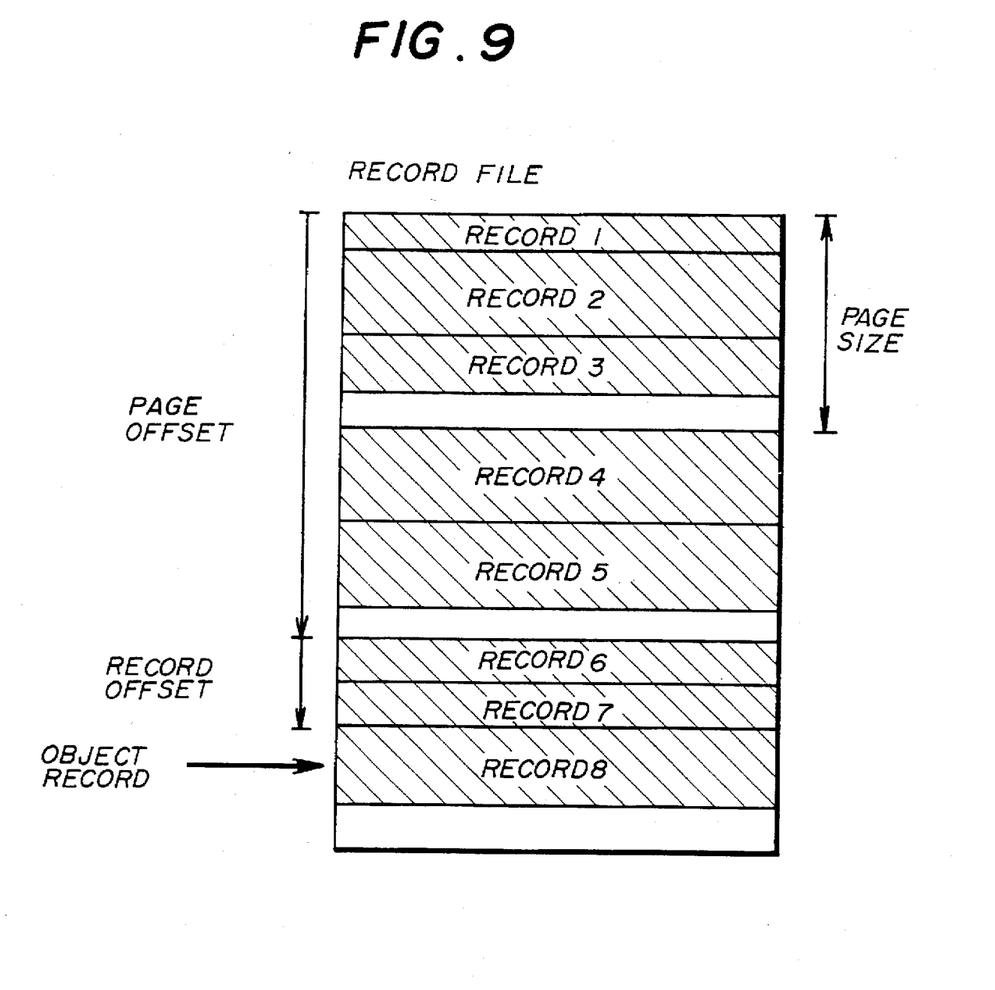
FIG. 9 is an illustration showing the structure of a record file shown in FIG. 1.

A description will now be given, with reference to FIG. 9, of a structure of the record file 13. FIG. 9 is an illustration showing the structure of the record file 13 used in the present embodiment. The record file 13 is divided into a plurality of areas, each area (referred to as a page) having a predetermined size. Three pages are shown in FIG. 9, records 1, 2 and 3 being stored in a first page, records 4 and 5 being stored in a second page, and records 6, 7 and 8 being stored in a third page. A blank in the end of each page is an area in which a record is not filed.

The record identifier is determined by a page offset and a record offset. The page offset and the record offset are defined by a number of bytes. As shown in FIG. 9, if the document data is stored as a record 8 in the record file 13, the record identifier of the document data stored in the record file 13 is determined to be a sum of the page offset and the record offset.

Figure 10:
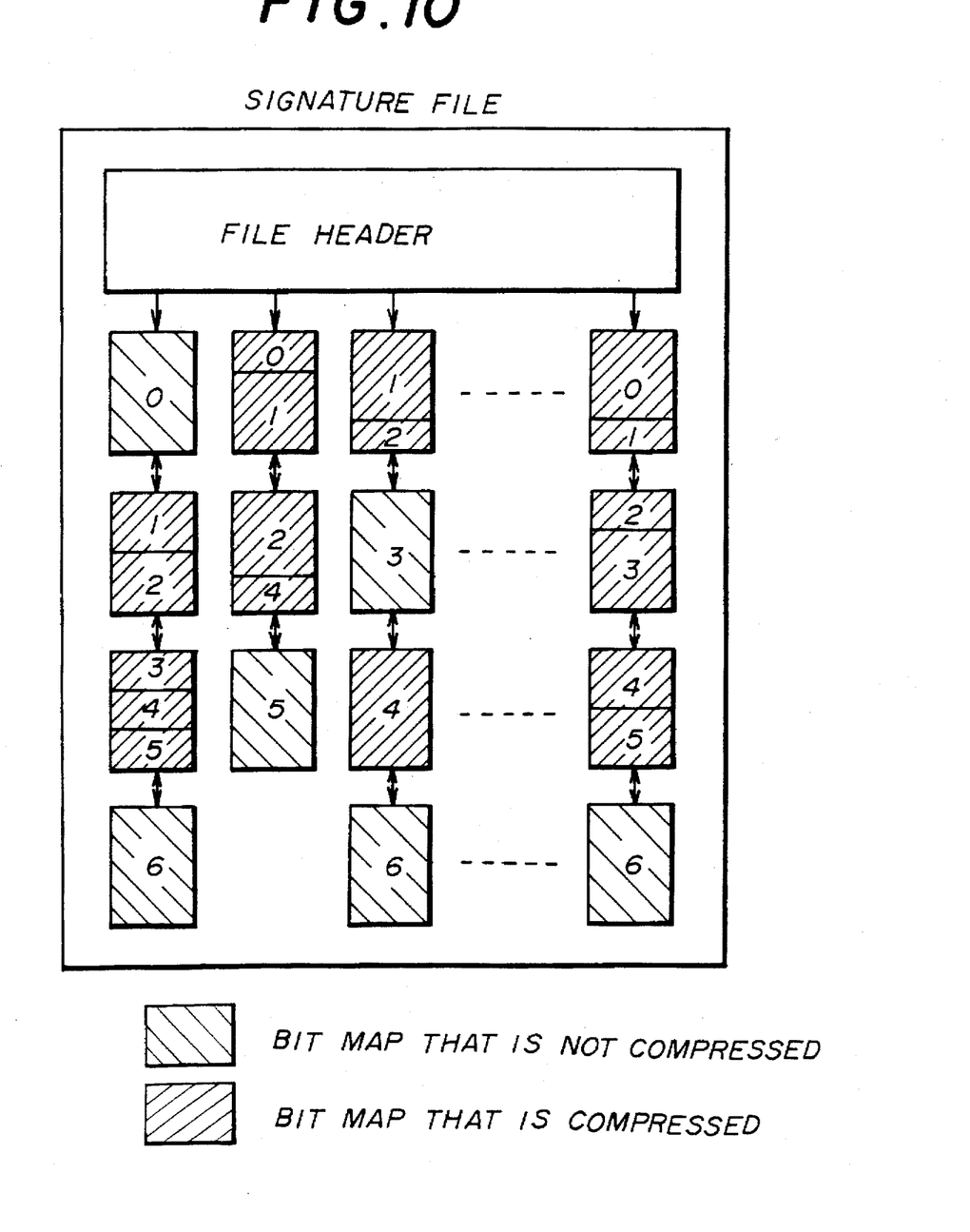
FIG. 10 is an illustration showing the structure of a signature file shown in FIG. 1.

A description will now be given, with reference to FIG. 10, of a structure of the signature file 12. FIG. 10 is an illustration showing a structure of the signature file 12 used in the present embodiment.

The signature file 12 comprises a file header and a plurality of areas, each area (referred to as a page) having a predetermined size to store bitmaps of signatures. In the following description, the pages in the signature file 12 are referred to as bitmap pages. A bit sliced bitmap of the signatures is stored in the bitmap pages either in a form that is compressed or in a form that is not compressed. When the bitmap that is compressed is stored, a plurality of compressed bitmaps are stored in a single bitmap page as many as possible. When the bitmap that is not compressed is stored, only a single bitmap is stored in a single bitmap page. This case occurs when a bitmap is stored in the last page of a set of bitmap pages, or when a size of a bitmap will become larger than that of the original bitmap if it is compressed. The bit sliced bitmap of a set of block signatures which corresponds to single document data is stored in a set of bitmap pages as shown in FIG. 10. Each bitmap page in a set of bitmap pages can be sequentially accessed by list information provided in each of the bitmap pages. An offset of the first bitmap page of each set of bitmap pages is recorded in the file header. Additionally, a total number of bits which are set to "1" is recorded in the file header for each bit sliced bitmap.

If each of the bitmap pages shown in FIG. 10 stores, for example, 1000 bits, 7,000 block signatures can be stored in the signature file shown in FIG. 10 since 7 bitmap pages are provided in a single set of bitmap pages. However, for example, the set of bitmap pages on the far left side in the figure comprises 4 bitmap pages since the bitmaps No. 1 to No. 5 are compressed. The set of bitmap pages in the second position from the left does not have bitmaps No. 3 and No. 6. This condition indicates that bits in the bitmaps No. 3 and No. 6. are all "0". Additionally, the bitmap page positioned at the end of each set of bitmap pages is never compressed, to eliminate an expanding operation of a bitmap stored in the last bitmap page when a new block signature is registered by setting "1" in a bit position corresponding to the block signature in the last bitmap page. That is, when a new block signature is added, and if a bitmap currently stored in the last bitmap page is compressed, the bitmap has to be expanded because a compressing operation must be performed on an entire bitmap page. In the present embodiment, since the bitmap is stored by dividing it into a plurality of bitmap pages, a compressing operation and an expanding operation can be performed on each bitmap page basis.

In the signature file shown in FIG. 10, a storing operation of the block signature extracted from the document data and a compressing operation of the bitmap are performed in accordance with the following procedure.

1) A bit position is obtained in one block signature, which bit position is set to "1", and then the offset of the first bitmap page of the set of bitmap pages is obtained, which set of bitmap pages includes the bitmap page in which the bitmap corresponding to the above-mentioned bit position being set to "1" is stored.

2) The bitmap page is searched for from the set of bitmap pages by referring to the list information to find out which bitmap page stores the bitmap corresponding to the bit position set to "1" in the one block signature.

3) If the object bitmap page is found in 2), the corresponding bit position of the bitmap in the object bitmap page is set to "1", and the operation is ended.

4) If the object bitmap page is not found in 2), a new bitmap page is added to the last bitmap page so that the bitmap corresponding to the bit position set to "1" is stored in the newly added bitmap page. If possible, the current last bitmap in the last bitmap page is compressed so that the compressed bitmap page is stored in the preceding bitmap page. In this case, the newly added bitmap is stored in the current last bitmap page, and thus there is no need to add the new bitmap page.

The storing position calculating unit 7 receives, as an input, a block number of a block signature and a record identifier of a record in the record file 13 in which record document data is stored, and outputs storing position information of the block signature in the signature file 12. The block number of the block signature represents a number of blocks in the document data, which blocks contain character strings from each of which the block signature is extracted. The storing position information represents a position of a bit which is to be set to "1" in a bit sliced bitmap.

The storing position calculating unit 7 calculates the storing position h by using the following equation:

$$h=((r/P)*N+(r\%P))*B+b$$

where, b is a block number;

r is a record identifier;

N is a maximum number of records that can be stored in a single page in a record file;

P is a number of bytes of a single page in a record file;

B is a maximum number of blocks of document data;

h is a storing position of a block signature; and

+, *, / and % are operators for obtaining a sum, a product, a quotient and a residue, respectively.

The record identifier calculating unit 4 receives, as an input, storing position information of a block signature, and outputs a record identifier. The record identifier calculating unit 4 calculates the record identifier r by using the following equation:

$$r=(h/B)/N*P+(h/B)\%N$$

By using the above equations, the record identifier can be obtained from the storing position of the block signature without a mapping table.

The present invention is not limited to the specifically disclosed embodiments, and variations and modifications may be made without departing from the scope of the present invention.

What is claimed is:

1. A document retrieval apparatus which retrieves document data registered therein, the document data containing a character string identical to a search character string which is to be searched for, said document retrieval apparatus comprising:

an input unit through which the document data to be registered and the search character string to be searched for are input;

a processing unit, connected to said inputting unit, converting the document data and the character string into character codes, respectively, by using a predetermined character code conversion method, said processing unit extracting signatures comprising a binary bit pattern extracted from a character string from each of the character codes, and calculating a first record identifier of the document data to be stored, according to which first record identifier the signature corresponding to the document data to be registered is stored, said processing unit retrieving the document data containing a character string identical to the character string to be searched for by referring to a second record identifier calculated based on a storing position of the signature;

a data storing unit comprising a record file and a signature file, said record file storing the document data to be registered, said signature file storing the signature corresponding to the document data to be registered, the signature being stored in a storing position in said signature file, said storing position being designated by the first record identifier of corresponding document data stored in said record file; and an output unit, connected to said processing unit, outputting the document data retrieved by said processing unit, which document data contains the character string identical to said search character string to be searched for.

2. The document retrieval apparatus as claimed in claim 1, wherein said processing unit comprises:

a character string inputting unit for receiving the document data and the character string from said input unit, and converting the document data and the character string into character codes by the predetermined character code conversion method;

a signature extracting unit for dividing the document data into a plurality of blocks containing a predetermined number of characters, a block signature being extracted from each of the blocks, said signature extracting unit extracting a partial character string from the search character string and extracting a search signature from the partial character string;

a document registering unit for storing the document data to be registered in said record file, and for supplying the document data to said signature extracting unit;

a document search processing unit for supplying the character string converted by the character string inputting unit, and retrieving the document data which is determined to contain a character string identical to the search character string, a determination being performed by comparing a bitmap of the block signature with a bitmap of the search signature extracted from the partial character string;

a storing position calculating unit for calculating the first record identifier of the document data to be stored, according to which first record identifier the block signature corresponding to the document data to be registered is stored in said signature file, a calculation performed by said storing position calculating unit being performed based on the storing position of the document data in said record file;

a record identifier calculating unit for calculating the second record identifier based on the storing position of the document data in said record file, a calculated second record identifier being supplied to said document search processing unit; and a document output processing unit for selecting actual document data which actually contains a character string identical to the search character string, the actual document data being selected from the document data retrieved by said document search processing unit, and supplying the actual document data to said output unit.

3. The document retrieval apparatus as claimed in claim 2, wherein said signature file stores the block signature so that a bit sliced bitmap is formed by the block signatures in said signature file, a total number of bits in each bit sliced bitmap being obtained, which bits are set to 1, before a comparing operation of the bitmaps is performed by the document search processing unit so that a bit sliced bitmap having a smaller number of bits set to 1 is compared first.

4. The document retrieval apparatus as claimed in claim 3, wherein said signature extracting unit selects the search signature from the signatures extracted from the search character string so that a bitmap having a smaller number of bits set to 1 is used when said document search processing unit performs a retrieving operation for the document data.

5. The document retrieval apparatus as claimed in claim 2, wherein said record file is divided into a plurality of areas having a predetermined number of bytes so that a storing position of particular document data stored in said record file is determined by a sum of a page offset of said record file and a record offset of said page, said page offset being a number of bytes corresponding to a number of pages from a first page to a particular page in which said particular document data is stored, said record offset being a number of bytes from a first position in said particular page to a position from which said particular document data is stored.

6. The document retrieval apparatus as claimed in claim 2, wherein the bit sliced bitmap is stored in a set of areas in said signature file, each of said areas storing a predetermined number of bits and having list information by which a connection of said areas in said set is designated, a registering operation of bits to be set to 0 being skipped when storing the signature in said signature file by obtaining storing position of bits to be set to 1.

7. The document retrieval apparatus as claimed in claim 2, wherein the bit sliced bitmap is stored in a set of bitmap pages which are areas in said signature file, each of said bitmap pages storing a predetermined number of bits and having list information by which a connection of said areas in said set is designated, the bit sliced bitmap being compressed if a compressed bit sliced bitmap becomes smaller than the bit sliced bitmap which is not compressed, each of said bitmap pages storing the bit sliced bitmap in either the compressed or not compressed form.

8. The document retrieval apparatus as claimed in claim 7, wherein a last bitmap page in said set of bitmap pages always stores the initial bit sliced bitmap in a form which is not compressed.

9. The document retrieval apparatus as claimed in claim 1, wherein said processing unit determines, when the document data is registered, a storing position of the signature of the document data in said signature file by a calculation based on the first record identifier, and said processing unit determines, when the document data is retrieved from said record file, the second record identifier of the document data to be retrieved by a calculation based on the storing position of the signature of the document data.

* * * * *